April 25, 1950        A. J. HIGGINS        2,505,544
SYSTEM FOR CALKING BOATS
Filed April 24, 1946
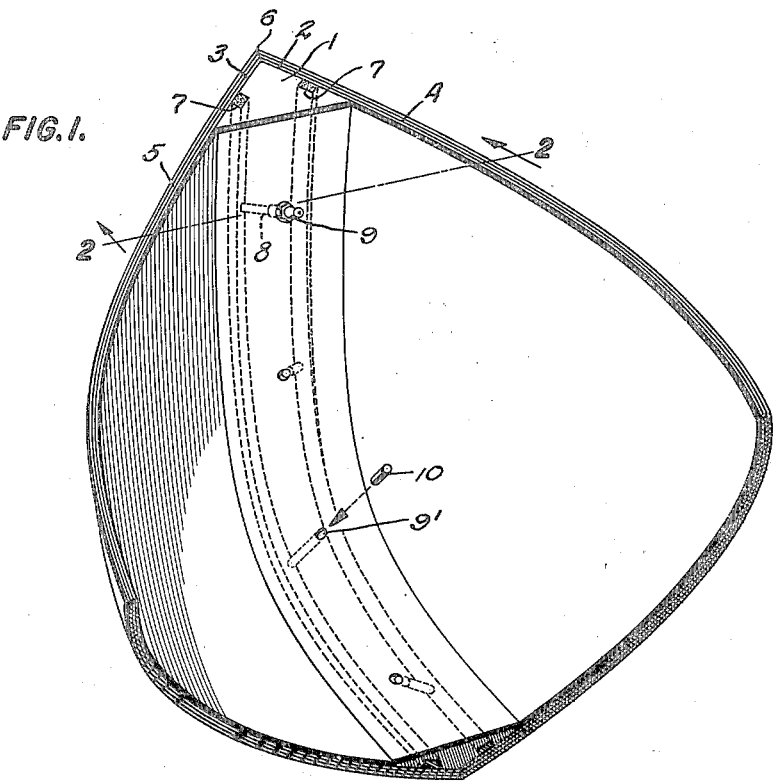
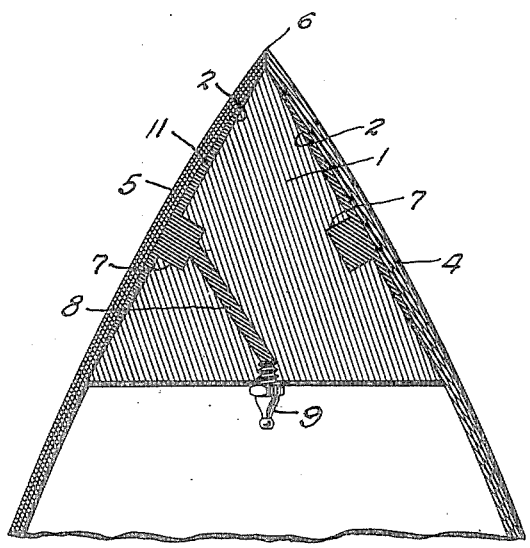
Inventor
A. J. HIGGINS Patented Apr. 25, 1950

2,505,544

UNITED STATES PATENT OFFICE 2,505,544

SYSTEM FOR CALKING BOATS

Andrew J. Higgins, New Orleans, La., assignor to Higgins, Inc., New Orleans, La., a corporation of Louisiana Application April 24, 1946, Serial No. 664,633

3 Claims. (Cl. 9—6)

This invention relates broadly to a method of caulking a joint between lapped members.

It has for its general object providing a groove between said members opening into the interface of the joint and injecting a fluent sealing substance into said groove under pressure.

A more specific object of the invention is the provision in the method as described, of bores at intervals lengthwise of the groove to serve as vents or filling apertures to which the pressure gun may be applied, whereby the sealing compound may be introduced into the groove at various points, minimizing frictional resistance to filling, particularly in very long grooves, or as indicators of the progress of the caulking material through the joint. This method contemplates the use of plugs for closing the bores after they have served their purpose.

Still another object of the invention is the joint itself as part of an article of manufacture.

Other objects of the invention will appear as the following disclosure of a preferred and practical embodiment thereof proceeds.

The invention in its illustrated embodiment is applied to the caulking of a boat, Figure 1 of the drawing being a perspective view of the bow portion; and Figure 2 being a cross-section on an enlarged scale, taken along the line 2—2 of Figure 1.

Referring to the details of construction, the numeral 1 represents the stem piece which has forwardly convergent sides 2 and 3. The skin of the boat, as shown, is of plywood, consisting of the side sheets 4 and 5 which lap the convergent sides of the stem piece and are glued thereto, coming to a butt joint 6 at the apex of the stem.

Since plywood opposes strong resistance to being bent to a compound curve, there is a good chance that it will not make perfect surface contact with the sides of the stem piece, so that there may be faults in the glue interface between the plywood and stem piece, establishing a leakage path through the joint for water that may seep in through the butt joint 6.

To prevent this leakage, the stem piece 1 is formed with longitudinal grooves 7, indenting the sides 2 and 3 intermediate the front and rear edges of said sides. These grooves may be of any desired cross-sectional area, ⅜ by ⅛ inch, or ⅜ by 1/16 inch, being practical and economical dimensions.

The grooves may be filled through the top, if desired, but since the cross-sections of the grooves are generally non-circular, it is more practical to provide at any convenient point a filling bore 8 drilled through the stem piece and communicating with the groove 7, into the outer end of which a fitting 9, such as an ordinary grease fitting, can be frictionally inserted in fluid tight manner. A pressure caulking gun is applied to the fitting and plastic caulking compound forced into the groove under pressure. When the caulking compound appears at the top end of the groove, this can be temporarily stoppered to divert further extrusion in a downward direction.

If the groove 7 be long, it may be desirable to drill more than one filling bore opening into the groove 7. An additional bore 9' is shown in Figure 1. When the caulking compound shows at this bore, the fitting 8 may be transferred to this bore and further filling of the groove conducted from this point. The bore or bores not occupied by the fitting 8 may be plugged with the plugs 10, to prevent back flow through parts of the groove already filled, and finally, the fitting 8 may be removed and the last bore plugged. If desired, the fitting 8 can be left in place to facilitate recaulking at a future period, if required.

The caulking compound forms a continuous seal throughout the joint between the plywood sides 4 and 5 and the sides of the stem piece 1, and where the plywood planking may not be in surface contact with the stem piece, the caulking compound spreads out under pressure beyond the sides of the groove 7, filling the void between the stem piece and planking, as shown at 11 in Figure 2.

In the subsequent life of the boat, should a leak appear through the joint, the plug or plugs 10 adjacent the leak may be removed and the joint recaulked by the introduction under pressure of additional compound.

While I have in the foregoing description disclosed a preferred and practical form of the invention, it will be understood by those skilled in the art that the specific details of construction and arrangement of parts are by way of illustration and not to be construed as limiting the scope of the invention.

What I claim as my invention is:

1. In boat construction, a hull frame member having a side face shaped approximately to conform to the contour of the covered hull, a plywood skin member stressed to assume the hull shape, lapped upon the side face of said frame member and being secured thereto under stress so as to be separated from said side face in an intermediate zone extending longitudinally of said side face, means for conforming said side face to said sheet throughout said zone and at the same time forming a caulking joint between said sheet and frame member, comprising a channel in said side face extending longitudinally throughout said zone, opening into the space between said sheet and side face, said frame member being provided at intervals longitudinally of said zone with plug closed bores communicating with said channel and having their closed ends terminating in an exposed face of said frame member, and a mass of caulking compound filling the space between said sheet and said face, said channel and said bores.

2. In boat construction, a hull frame member having a side face shaped approximately to conform to the contour of the covered hull, a stiff skin member stressed to assume the hull shape, lapped over the side face of said frame member and secured under stress to said frame member so as to lie separated from said side face in an intermediate zone extending longitudinally of said side face, means for conforming said side face to said skin member throughout said zone and at the same time forming a caulking joint between said skin and frame members, comprising a channel in said side face extending longitudinally throughout said zone opening into the space between said skin member and side face, said frame member being provided at longitudinal intervals with plug closed bores communicating with said channel and having their closed ends terminating in an exposed face of said frame member, and a mass of caulking compound filling the space between said skin member and side face, said channel and said bores.

3. Method of making a plywood boat comprising providing a hull frame member having a side face shaped approximately to conform to the contour of the covered hull, forming a channel in an intermediate portion of said side face extending longitudinally thereof, provided with lateral bores communicating therewith and opening on an exposed side of said frame member, bending a sheet of plywood to cause it to assume the hull shape and positioning it in lapped relation to said side face, securing said sheet to said frame member under stress in such manner that it remains separated from said side face in an intermediate zone extending longitudinally of said side face and traversed by said channel, introducing caulking compound under pressure selectively through said lateral bores to fill the space between said sheet and side face, said channel and said bores, thereby building up said side face to conform to the contour of said plywood sheet and at the same time forming the caulking seal between said sheet and side face, and plugging the outer ends of said bores.

ANDREW J. HIGGINS.

REFERENCES CITED

The following references are of record in the file of this patent:

UNITED STATES PATENTS

| Number | Name | Date |
|---|---|---|
| 1,698,255 | Carns | Jan. 8, 1929 |
| 1,805,812 | De Witt | May 19, 1931 |
| 2,193,892 | Van Gorden | Mar. 19, 1940 |

FOREIGN PATENTS

| Number | Country | Date |
|---|---|---|
| 455,088 | Great Britain | Oct. 29, 1935 |